United States Patent
Guo et al.

(10) Patent No.: US 10,318,068 B2
(45) Date of Patent: Jun. 11, 2019

(54) SIMULTANEOUS DISPLAY AND TOUCH SCANNING METHODS AND DEVICES OF TOUCH DISPLAY PANELS

(71) Applicant: Wuhan China Star Optoelectronics Technology Co., Ltd., Wuhan, Hubei (CN)

(72) Inventors: Xingling Guo, Guangdong (CN); Jiehui Qin, Guangdong (CN); Chun-Hung Huang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 192 days.

(21) Appl. No.: 15/327,844

(22) PCT Filed: Jan. 16, 2017

(86) PCT No.: PCT/CN2017/071232
§ 371 (c)(1),
(2) Date: Jan. 20, 2017

(87) PCT Pub. No.: WO2018/120315
PCT Pub. Date: Jul. 5, 2018

(65) Prior Publication Data
US 2018/0210585 A1    Jul. 26, 2018

(30) Foreign Application Priority Data
Dec. 30, 2016 (CN) .......................... 2016 1 1259142

(51) Int. Cl.
G06F 3/041 (2006.01)
G06F 3/044 (2006.01)
G09G 3/20 (2006.01)

(52) U.S. Cl.
CPC ............ G06F 3/0418 (2013.01); G06F 3/044 (2013.01); G06F 3/0412 (2013.01); G09G 3/20 (2013.01);
(Continued)

(58) Field of Classification Search
CPC .... G06F 3/0412; G06F 3/0416; G06F 3/0418; G06F 3/044; G09G 3/20;
(Continued)

(56) References Cited

U.S. PATENT DOCUMENTS 8,508,503 B2   8/2013  Lin et al.
9,329,725 B2   5/2016  Pyo et al.
(Continued)

FOREIGN PATENT DOCUMENTS

CN            104345928 A      2/2015

Primary Examiner — Darlene M Ritchie
(74) Attorney, Agent, or Firm — Andrew C. Cheng (57) ABSTRACT

The present disclosure relates to a driving method and a driving device of touch display panels, and a touch display. The driving method includes: detecting a voltage potential of at least one pixel electrode within the areas of the touch display panel corresponding to different touch scanning partitions, negating the voltage potential, overlapping the negated voltage potential and feed-backed touch pulse signals, and adopting overlapped signals to be the detected touch pulse signals. With the configuration of the touch scanning partitions, the voltage potentials of the pixel electrodes within each of the areas are adopted to respectively adjust the feed-backed touch pulse signals such that the display scanning and the touch scanning can be conducted simultaneously. The detection precision of the touch pulse signals may be enhanced without affecting the display performance.

11 Claims, 4 Drawing Sheets

(52) U.S. Cl.
CPC . *G02F 2201/123* (2013.01); *G09G 2310/067* (2013.01)

(58) Field of Classification Search
CPC ...... G09G 2310/067; G09G 2320/0219; G02F 2201/123; G02F 1/13338
See application file for complete search history.

(56) References Cited

U.S. PATENT DOCUMENTS

| | | |
|---|---|---|
| 9,665,220 B2 * | 5/2017 | Park ........................ G06F 3/044 |
| 2011/0298746 A1 | 12/2011 | Hotelling |
| 2015/0054763 A1 | 2/2015 | Yang et al. |
| 2015/0199051 A1 | 7/2015 | Noguchi et al. |
| 2016/0364061 A1 | 12/2016 | Zhao et al. |

\* cited by examiner

SIMULTANEOUS DISPLAY AND TOUCH SCANNING METHODS AND DEVICES OF TOUCH DISPLAY PANELS

BACKGROUND OF THE INVENTION

1. Field of the Invention

The present disclosure relates to display technology, and more particularly to a driving method and a driving device of touch display panels and a touch display.

2. Discussion of the Related Art

With the intensification of the competition in the intelligent terminal market, the structural design of the intelligent terminal has become one of the focuses. An important solution to realize the thin and light display screen of the intelligent terminal is to adopt embedded touch technology to replace the original plug-in touch technology. Embedded touch technology relates to embed the touch panel within the display panel, and then the embedded touch technology realizes the light and thin design on intelligent terminals.

With respect to the conventional embedded touch technology, a time-sharing scanning method is generally employed, in which the timing controller divides a frame period into display period and touch period, and grants a display period to the display device, wherein the storage capacitor may be charged within the display period. In addition, the touch signals are detected during the touch period. The advantage of this scanning method is that the mutual interference between the display and the touch is small, but due to such division, the display period in one frame cycle time is shortened, and the charging time of the storage capacitor is shortened. Thus, the display effect may be affected.

SUMMARY

The object of the invention is to provide a driving method and a driving device of touch display panels and a touch display for enhancing the precision of the detected touch pulse signals.

In one aspect, a touch display includes: a touch display panel and a driving device connecting to the touch display panel; the driving device includes: a voltage detection circuit connecting to the touch display panel, and the voltage detection circuit being configured for detecting at least one voltage potential of pixel electrodes within areas of the touch display panel, and the areas corresponding to different touch scanning partitions; a compensation noise-deduction circuit connecting to the voltage detection circuit, and the compensation noise-deduction circuit being configured for negating the voltage potential detected by the voltage detection circuit, overlapping the negated voltage potential and feed-backed touch pulse signals, and adopting overlapped signals as the detected touch pulse signals; and wherein the touch display further comprising a touch pulse processing circuit connecting to the compensation noise-deduction circuit, and the touch pulse processing circuit being configured for recognizing the touch pulse signals and for conducting a corresponding touch operation in accordance with a recognition result.

Wherein the voltage detection circuit further includes: a grayscale value calculation circuit connects to the touch display panel, and the grayscale value calculation circuit is configured for calculating an average grayscale value of the pixel electrodes within the areas corresponding to different touch scanning partitions; and a voltage feedback circuit connects to the grayscale value calculation circuit, and the voltage feedback circuit is configured for converting the average grayscale value into the corresponding voltage potential.

Wherein the grayscale value calculation circuit calculates the grayscale values of the pixel electrodes within the areas corresponding to different touch scanning partitions, extracts characteristic grayscale values for calculating the average grayscale value from the grayscale values of the pixel electrodes; and calculating the average grayscale value of the pixel electrode of the areas in accordance with the characteristic grayscale value; and wherein the characteristic grayscale value includes a maximum grayscale value and a minimum grayscale value.

Wherein the grayscale value calculation circuit is configured within the display driving circuit, and the voltage feedback circuit and the compensation noise-deduction circuit are configured within the touch driving circuit of the touch display.

In another aspect, a driving method of touch display panels includes: detecting a voltage potential of at least one pixel electrode within the areas of the touch display panel corresponding to different touch scanning partitions; and negating the voltage potential, overlapping the negated voltage potential and feed-backed touch pulse signals, and adopting overlapped signals to be the detected touch pulse signals.

Wherein the step of detecting a voltage potential of at least one pixel electrode within the areas of the touch display panel corresponding to different touch scanning partitions further includes: calculating an average grayscale value of the pixel electrodes within the areas corresponding to different touch scanning partitions; and converting the average grayscale value into a corresponding voltage potential.

Wherein the step of calculating an average grayscale value of the pixel electrodes within the areas corresponding to different touch scanning partitions further includes: detecting the grayscale values of the pixel electrodes within the areas corresponding to different touch scanning partitions of the touch display panel; extracting a characteristic grayscale value from the grayscale value of the pixel electrode; calculating an average grayscale value of the pixel electrode within the areas in accordance with the characteristic grayscale value; and the characteristic grayscale value comprising at least a maximum grayscale value and a minimum grayscale value.

Wherein the step of overlapping the negated voltage potential and feed-backed touch pulse signals further includes: adopting the negated voltage potential and the feed-backed touch pulse signals to conduct operations.

Wherein the step of adopting overlapped signals to be the detected touch pulse signals further includes: recognizing the touch pulse signals and conducting a corresponding touch operation in accordance with a recognition result.

In another aspect, a driving device of touch display panels includes: a voltage detection circuit connecting to a touch display panel, and the voltage detection circuit being configured for detecting at least one voltage potential of pixel electrodes within areas of the touch display panel, and the areas corresponding to different touch scanning partitions; a compensation noise-deduction circuit connecting to the voltage detection circuit, and the compensation noise-deduction circuit being configured for negating the voltage potential detected by the voltage detection circuit, overlapping the negated voltage potential and feed-backed touch pulse signals, and adopting overlapped signals as the detected touch pulse signals.

Wherein the voltage detection circuit includes: a grayscale value calculation circuit connects to the touch display panel, and the grayscale value calculation circuit is configured for calculating an average grayscale value of the pixel electrodes within the areas corresponding to different touch scanning partitions; and a voltage feedback circuit connects to the grayscale value calculation circuit, and the voltage feedback circuit is configured for converting the average grayscale value into the corresponding voltage potential.

Wherein the grayscale value calculation circuit calculates the grayscale values of the pixel electrodes within the areas corresponding to different touch scanning partitions, extracts characteristic grayscale values for calculating the average grayscale value from the grayscale values of the pixel electrodes; and calculating the average grayscale value of the pixel electrode of the areas in accordance with the characteristic grayscale value; and wherein the characteristic grayscale value includes a maximum grayscale value and a minimum grayscale value.

Wherein the grayscale value calculation circuit is configured within the display driving circuit, and the voltage feedback circuit and the compensation noise-deduction circuit are configured within the touch driving circuit of the touch display.

Wherein the touch display further includes a touch pulse processing circuit connecting to the compensation noise-deduction circuit, and the touch pulse processing circuit is configured for recognizing the touch pulse signals and for conducting a corresponding touch operation in accordance with a recognition result.

In view of the above, the driving method includes: detecting a voltage potential of at least one pixel electrode within the areas of the touch display panel corresponding to different touch scanning partitions, negating the voltage potential, overlapping the negated voltage potential and feed-backed touch pulse signals, and adopting overlapped signals to be the detected touch pulse signals. With the configuration of the touch scanning partitions, the voltage potentials of the pixel electrodes within each of the areas are adopted to respectively adjust the feed-backed touch pulse signals such that the display scanning and the touch scanning can be conducted simultaneously. The detection precision of the touch pulse signals may be enhanced without affecting the display performance

DETAILED DESCRIPTION OF THE EMBODIMENTS

Embodiments of the invention will now be described more fully hereinafter with reference to the accompanying drawings, in which embodiments of the invention are shown.

Figure 1:
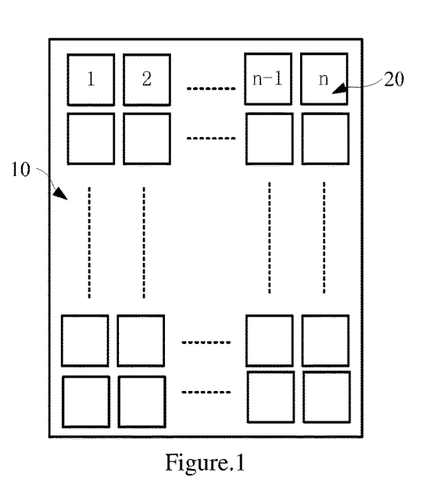
FIG. 1 is a schematic view of the touch scanning partitions of the touch display panel in accordance with one embodiment.

FIG. 1 is a schematic view of the touch scanning partitions of the touch display panel in accordance with one embodiment.

Figure 2:
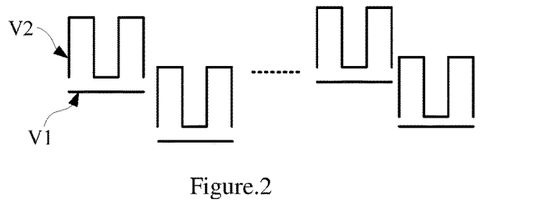
FIG. 2 is a pulse schematic view showing the voltage potential of the pixel electrodes in each of the partitions corresponding to the touch pulse signals of the first row in FIG. 1.

As shown in FIG. 1, the touch display panel 10 is divided into a plurality of touch scanning partitions 20. When the display scanning and the touch scanning are conducted at the same time, each of the touch scanning partitions 20 corresponding to the touch display panel 10 may affect the touch pulse signals. As the image displayed by the areas of the touch display panel 10 corresponding to the touch scanning partitions 20 are different, the voltage potential of the pixel electrodes within the areas of the touch display panel 10 are different. The scanning in regard to the touch signals is performed in accordance with the touch scanning partitions 20, such that the touch pulse signals feedback by the touch scanning partitions 20 may be affected by the voltage potential of the pixel electrode of the corresponding areas. Thus, the waveforms of the touch pulse signals feedback by the touch scanning partitions 20 are different, which may affect the precision of the detection of the touch pulse signals. The impact caused by the touch pulse signals feedback by each of the areas of the touch display panel 10 corresponding to the touch scanning partitions 20 is shown in FIG. 2. Taking the touch scanning partitions 20 in the first row in FIG. 1 as one example, the touch scanning partitions 20 includes a first to n-th areas. The solid-straight lines in FIG. 2 represent the respective voltage potential (V1) for the first area through the n-th area. As the voltage potentials (V1) for the first area through the n-th area are different, the impact caused by the touch pulse signals (V2) feedback by the touch scanning partitions 20 corresponding to the first area through the n-th area toward the voltage potential (V1) is different. Thus, the noise-deduction process cannot be applied to all of the touch scanning partitions 20 at one time.

Figure 3:
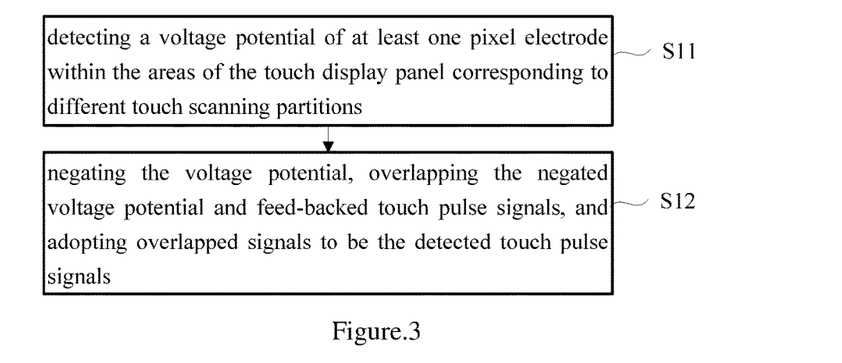
FIG. 3 is a flowchart illustrating the driving method of the touch display panel in accordance with a first embodiment.

FIG. 3 is a flowchart illustrating the driving method of the touch display panel in accordance with a first embodiment. The method includes the following steps.

In step S11, detecting a voltage potential of at least one pixel electrode within the areas of a touch display panel corresponding to different touch scanning partitions.

As the image displayed by the areas of the touch display panel 10 corresponding to the touch scanning partitions 20 are different, the voltage potential of the pixel electrodes within the areas of the touch display panel 10 are different. Thus, the impact caused by the touch pulse signals feedback by the touch scanning partitions corresponding to the areas of the touch display panel toward the voltage potential (V1) is different.

In this step, the voltage potential of the pixel electrode within the areas of the touch display panel corresponding to the touch scanning partitions are detected to obtain voltage potential of the pixel electrode within the areas of the touch display panel corresponding to the touch scanning partitions.

In step S12, negating the voltage potential, overlapping the negated voltage potential and the feed-backed touch pulse signals, and adopting the overlapped signals to be the detected touch pulse signals.

The term "negate" relates to reverse the "0" or "1". That is, when the voltage potential is 0, the negated voltage potential is 0, and when the voltage potential is 1, the negated voltage potential is 1. In addition, the term "negate" also means converting a positive voltage potential into a negative voltage potential, and the vice versa.

In the embodiment, the term "negate" means that the voltage potential is converted into a negative voltage potential, and the converted voltage potential is overlapped with the feed-backed touch pulse signals.

As the feed-backed touch pulse signals are the touch pulse signals being affected by the voltage potential of the pixel electrode of the areas of the touch display panel corresponding to different touch scanning partitions, the touch pulse signals may be raised up or pulled down along with the voltage potential of the pixel electrode of the areas. The negative signals of the voltage potential are obtained by negating the voltage potential of the touch pulse signals, and the negative signals of the voltage potential is overlapped with the touch pulse signals being affected by the corresponding voltage potential. As such, the impact caused from the voltage potential toward the touch pulse signals may be offset, such that the waveform of the voltage potential may back to the original one, which contributes to the noise reduction of the touch pulse signals.

In step S11, the step of detecting a voltage potential of at least one pixel electrode within the areas of a touch display panel corresponding to different touch scanning partitions may be conducted in a plurality of ways. As the voltage potential of the pixel electrode within each of the areas relates to the images displayed by each of the areas, that is, the voltage potential of the pixel electrode within each of the areas relates to the grayscale of the pixel electrode within the areas, the voltage potential of the pixel electrode within each of the areas may be calculated by obtaining the grayscale of the pixel electrode within each of the areas. Further, the negated voltage potential and the feed-backed touch pulse signals are overlapped, and this step may be conducted by adopting an AND gate or a corresponding signal processor.

In view of the above, the display scanning and the touch scanning of the touch display panel have not be separately conducted, and thus the display period within one frame of the touch display panel will not be affected, and so does the charging period of the storage capacitor. Thus, the display performance of the touch display panel will not be affected. In addition, the touch pulse signals of each of the areas are processed in accordance with the voltage potential of the pixel electrode of the areas corresponding to different touch scanning partitions, the touch pulse signals of each of the areas are the same, such that the precision of the detected touch pulse signals may be enhanced.

Figure 4:
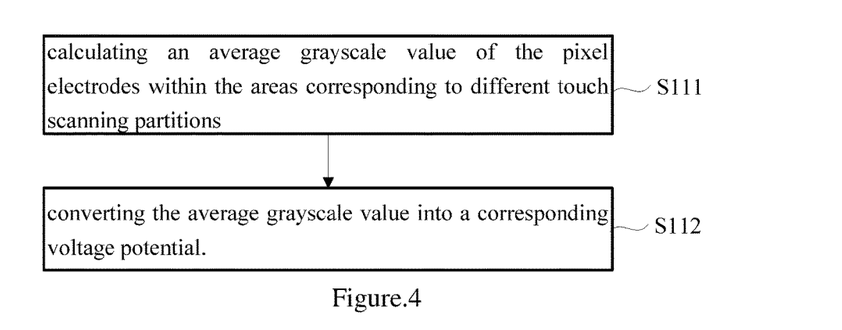
FIG. 4 is a flowchart showing the step S11 in FIG. 3.

Further, as shown in FIG. 4, the step S11 includes the following steps:

In step S111, calculating an average grayscale value of the pixel electrodes within the areas corresponding to different touch scanning partitions.

The voltage potentials of the pixel electrodes within the areas corresponding to different touch scanning partitions are different is due to that the images displayed by each of the areas are different. With respect to the pixel electrodes within each of the areas, the grayscale values of the pixel electrodes are different when the images are different, which further results in that the voltage potentials of the pixel electrodes of each of the areas are different. The voltage potential corresponds to the grayscale value of the pixel electrode, and thus the voltage potential of the pixel electrode within each of the areas may be obtained by obtaining the grayscale values of the pixel electrodes of the areas corresponding to different touch scanning partitions.

The areas corresponding to different touch scanning partitions includes a plurality of pixel electrodes, and thus the grayscale values of the pixel electrode within each of the areas is the average grayscale value of the pixel electrode within each of the areas.

Figure 5:
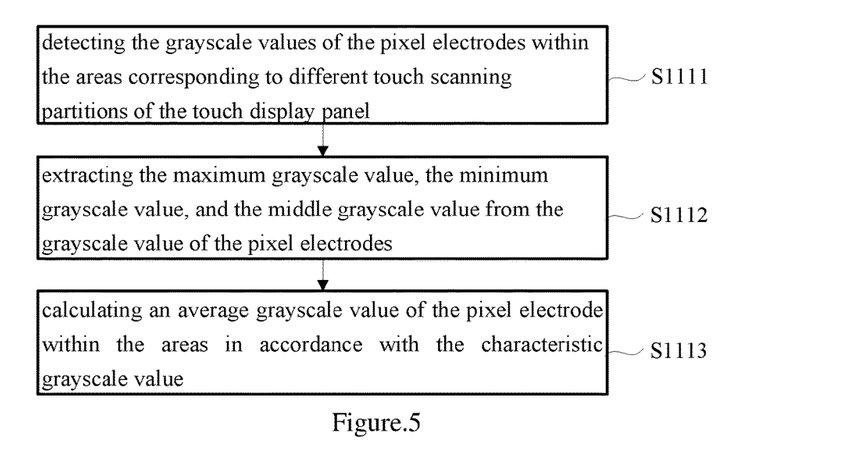
FIG. 5 is a flowchart showing the step S111 in FIG. 4.

In the embodiment, the step of calculating an average grayscale value of the pixel electrodes within each of the areas is shown in FIG. 5.

In step S1111, detecting the grayscale values of the pixel electrodes within the areas corresponding to different touch scanning partitions of the touch display panel.

As the areas corresponding to different touch scanning partitions includes a plurality of pixel electrodes, the grayscale values of the pixel electrodes within the areas corresponding to different touch scanning partitions of the touch display panel have to be obtained.

In step S112, extracting a characteristic grayscale value from the grayscale value of the pixel electrode.

In this step, a characteristic grayscale value of the average grayscale value of the respective areas is extracted from the grayscale values of pixel electrodes within the areas corresponding to different touch scanning partitions.

The characteristic grayscale value includes a maximum grayscale value and a minimum grayscale value, which are obtained from the grayscale values of the pixel electrodes within the areas corresponding to different touch scanning partitions in the step S1111. In addition, the characteristic grayscale value may include a middle grayscale value.

In step S1113, calculating an average grayscale value of the pixel electrode within the areas in accordance with the characteristic grayscale value.

If the extracted characteristic grayscale value is the maximum grayscale value and the minimum grayscale value, the average grayscale value is calculated in accordance with the maximum grayscale value and the minimum grayscale value obtained in the step S1112. Specifically, a sum of the maximum grayscale value and the minimum grayscale value and a quotient of the number of the corresponding pixel electrodes are adopted as the average grayscale value. Here, only two grayscale values are extracted, and the number of the pixel electrodes is two.

If the extracted grayscale values include the maximum grayscale value, the minimum grayscale value, and the middle grayscale value, the sum of the maximum grayscale value, the minimum grayscale value, and the middle grayscale value and the quotient of the number of the pixel electrode are adopted as the average grayscale value. Here, only three grayscale values are extracted, and the number of the pixel electrodes is three.

It is to be noted that, in step S1112, the number of the corresponding pixel electrode increases along with the number of the extracted characteristic grayscale values. In step S1112, if the grayscale values of all of the pixel electrodes in each of the are adopted as the characteristic grayscale values, the number of the corresponding pixel electrode is the number of the pixel electrodes within each of the areas. It can be understood that the precision of the average grayscale value is higher when the number of the extracted characteristic grayscale values is greater. However, such calculation amount may results in a longer calculation time, which may cause the delay of the feed-back touch pulse signals for each of the areas, and the precision of the detected touch pulse signals may be affected. Preferably, the characteristic grayscale value is the maximum grayscale value, the minimum grayscale value, and the middle grayscale value.

In step S112, converting the average grayscale value into a corresponding voltage potential.

In step S111, after obtaining the average grayscale value of the pixel electrodes within the areas corresponding to different touch scanning partitions, the average grayscale value is converted into a corresponding voltage potential.

Figure 6:
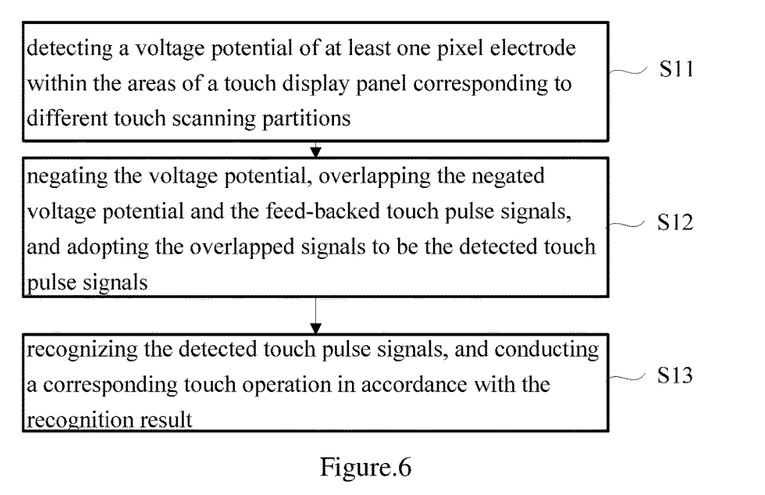
FIG. 6 is a flowchart illustrating the driving method of the touch display panel in accordance with a second embodiment.

FIG. 6 is a flowchart illustrating the driving method of the touch display panel in accordance with a second embodiment. The second embodiment further enhances the driving method in FIGS. 3-5. As shown in FIG. 6, the driving method further includes steps after the step S12 in the first embodiment.

In step S13, recognizing the detected touch pulse signals, and conducting a corresponding touch operation in accordance with the recognition result.

In step S12, the touch pulse signals after being applied with the noise reduction process are adopted as the detected touch pulse signals of the touch display panel. The touch pulse signals are recognized, and the corresponding touch operation is conducted in accordance with the recognition result.

Figure 7:
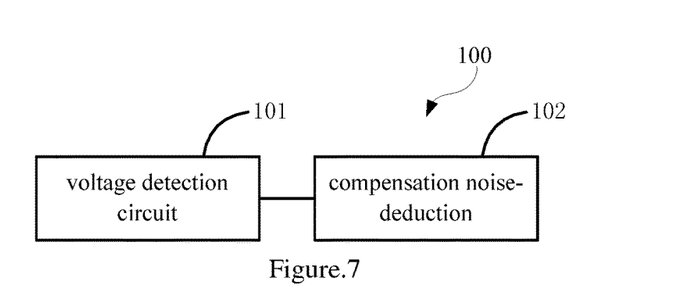
FIG. 7 is a schematic view of the driving device of the touch display panel in accordance with the first embodiment.

FIG. 7 is a schematic view of the driving device of the touch display panel in accordance with the first embodiment. The driving device 100 includes the following components.

A voltage detection circuit 101 connects to the touch display panel, and the voltage detection circuit 101 is configured for detecting the voltage potential of the pixel electrodes within the areas corresponding to different touch scanning partitions.

A compensation noise-deduction circuit 102 connects to the voltage detection circuit 101, and the compensation noise-deduction circuit 102 is configured for negating the voltage potential detected by the voltage detection circuit 101, overlapping the negated voltage potential and the feed-backed touch pulse signals, and adopting the overlapped signals as the detected touch pulse signals.

Figure 8:
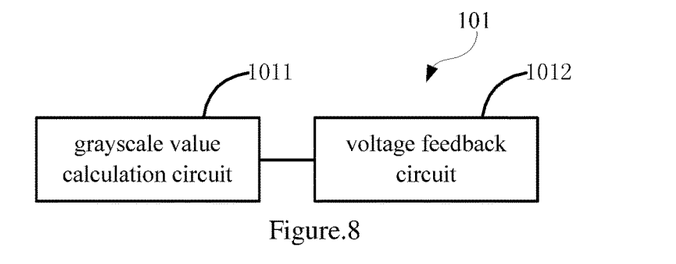
FIG. 8 is a schematic view of the voltage detection circuit in FIG. 7.

Further, as shown in FIG. 8, the voltage detection circuit 101 includes:

A grayscale value calculation circuit 1011 connects to the touch display panel, and the grayscale value calculation circuit 1011 is configured for calculating the average grayscale value of the pixel electrodes within the areas corresponding to different touch scanning partitions.

Specifically, the grayscale value calculation circuit 1011 calculates the grayscale values of the pixel electrodes within the areas corresponding to different touch scanning partitions, extracts the characteristic grayscale values for calculating the average grayscale value from the grayscale values of the pixel electrode; and calculating the average grayscale value of the pixel electrode of the areas in accordance with the characteristic grayscale value, wherein the characteristic grayscale value includes a maximum grayscale value and a minimum grayscale value.

A voltage feedback circuit 1012 connects to the grayscale value calculation circuit 1011, and the voltage feedback circuit 1012 is configured for converting the average grayscale value into a corresponding voltage potential.

Further, the driving device 100 is configured on the basis of conventional driving system of the touch display panel. The grayscale value calculation circuit 1011, the voltage feedback circuit 1012, and the compensation noise-deduction circuit 102 relate to the display driving circuit and touch driving circuit of the touch display panel. Specifically, the grayscale value calculation circuit 1011 is configured within the display driving circuit, and the voltage feedback circuit 1012 and the compensation noise-deduction circuit 102 are configured within the touch driving circuit.

The driving device 100 in this embodiment corresponds to the driving method in FIGS. 3-5. That is, the steps in the driving methods in FIGS. 3-5 are executed by the corresponding circuits in the driving device.

Figure 9:
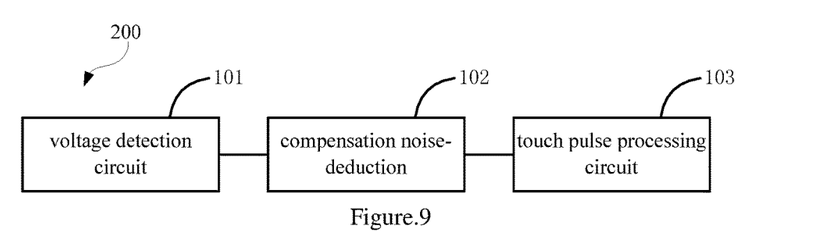
FIG. 9 is a schematic view of the driving device of the touch display panel in accordance with second first embodiment.

FIG. 9 is a schematic view of the driving device of the touch display panel in accordance with second first embodiment. As shown in FIG. 9, the driving device 200, on the basis of the driving device 100 in FIGS. 7 and 9, further includes the modules below.

A touch pulse processing circuit 103 connects to the compensation noise-deduction circuit 102, and the touch pulse processing circuit 103 is configured for recognizing the touch pulse signals and for conducting a corresponding touch operation in accordance with the recognition result.

The driving device 200 corresponds to the second embodiment in FIG. 6. The steps of the driving method in the second embodiment, as shown in FIG. 6, are respectively conducted by the circuits of the driving device 200.

Figure 10:
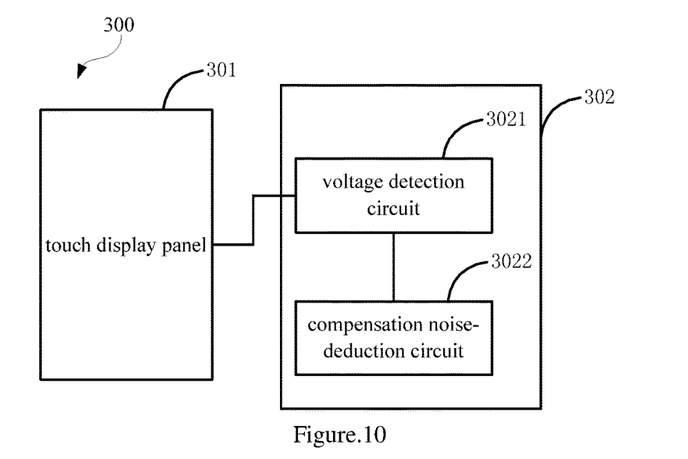
FIG. 10 is a schematic view of the touch display in accordance with one embodiment.

FIG. 10 is a schematic view of the touch display in accordance with one embodiment.

As shown in FIG. 10, the touch display 300 includes a touch display panel 301 and a driving device 302. The touch display panel 301 connects to the driving device 302, and the touch display panel 301 is driven by the driving signals of the driving device 302 to conduct corresponding display or touch operations.

The driving device 302 includes the voltage detection circuit 3021 and the compensation noise-deduction circuit 3022.

The voltage detection circuit 3021 connects to the touch display panel 301, and the voltage detection circuit 3021 is configured for detecting the voltage potentials of the pixel electrodes within the areas corresponding to different touch scanning partitions. The compensation noise-deduction circuit 3022 connects to the voltage detection circuit 3021, and the compensation noise-deduction circuit 3022 is configured for negating the detected voltage potential, overlapping the negated voltage potential and the received touch pulse signals, and adopting the overlapped signals as the detected touch pulse signals.

Further, the driving device of the touch display 300 corresponds to the driving device in FIGS. 7-9, and thus the descriptions are omitted hereinafter.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A touch display, comprising:
a touch display panel and a driving device connecting to the touch display panel;
the driving device comprising:
a voltage detection circuit connecting to the touch display panel, and the voltage detection circuit being configured for detecting at least one voltage potential of pixel electrodes within areas of the touch display panel, and the areas corresponding to different touch scanning partitions;

a compensation noise-deduction circuit connecting to the voltage detection circuit, and the compensation noise-deduction circuit being configured for negating the voltage potential detected by the voltage detection circuit, overlapping the negated voltage potential and feed-backed touch pulse signals, and adopting overlapped signals as the detected touch pulse signals; and wherein the touch display further comprising a touch pulse processing circuit connecting to the compensation noise-deduction circuit, and the touch pulse processing circuit being configured for recognizing the touch pulse signals and for conducting a corresponding touch operation in accordance with a recognition result, wherein the voltage detection circuit further comprises:

a grayscale value calculation circuit connected to the touch display panel, and the grayscale value calculation circuit is configured for calculating an average grayscale value of the pixel electrodes within the areas corresponding to different touch scanning partitions, wherein the grayscale value calculation circuit calculates the grayscale values of the pixel electrodes within the areas corresponding to different touch scanning partitions, extracts characteristic grayscale values for calculating the average grayscale value from the grayscale values of the pixel electrodes; and calculates the average grayscale value of the pixel electrodes of the areas in accordance with the characteristic grayscale value;

wherein the characteristic grayscale value only comprises a maximum grayscale value, a minimum grayscale value, and a middle grayscale value; and wherein only the sum of the maximum grayscale value, the minimum grayscale value, and the middle grayscale value and the quotient of the three pixel electrodes corresponding to those characteristic grayscale values are adopted as the average grayscale value.

2. The touch display as claimed in claim 1, wherein the voltage detection circuit further comprises:

a voltage feedback circuit connected to the grayscale value calculation circuit, and the voltage feedback circuit is configured for converting the average grayscale value into the corresponding voltage potential.

3. The touch display as claimed in claim 2, wherein the grayscale value calculation circuit is configured within the display driving circuit, and the voltage feedback circuit and the compensation noise-deduction circuit are configured within the touch driving circuit of the touch display.

4. A driving method of touch display panels, comprising:

detecting a voltage potential of at least one pixel electrode within the areas of the touch display panel corresponding to different touch scanning partitions; and negating the voltage potential, overlapping the negated voltage potential and feed-backed touch pulse signals, and adopting overlapped signals to be the detected touch pulse signals, wherein the step of detecting a voltage potential of at least one pixel electrode within the areas of the touch display panel corresponding to different touch scanning partitions further comprises:

calculating an average grayscale value of the pixel electrodes within the areas corresponding to different touch scanning partitions, wherein the step of calculating an average grayscale value of the pixel electrodes within the areas corresponding to different touch scanning partitions further comprises:

detecting the grayscale values of the pixel electrodes within the areas corresponding to different touch scanning partitions of the touch display panel;

extracting a characteristic grayscale value from the grayscale value of the pixel electrodes;

calculating an average grayscale value of the pixel electrode within the areas in accordance with the characteristic grayscale value;

the characteristic grayscale value only comprising a maximum grayscale value, a minimum grayscale value, and a middle grayscale value;

wherein only the sum of the maximum grayscale value, the minimum grayscale value, and the middle grayscale value and the quotient of the three pixel electrodes corresponding to those characteristic grayscale values are adopted as the average grayscale value; and recognizing the touch pulse signals and conducting a corresponding touch operation in accordance with a recognition result.

5. The driving method as claimed in claim 4, wherein the step of detecting a voltage potential of at least one pixel electrode within the areas of the touch display panel corresponding to different touch scanning partitions further comprises:

converting the average grayscale value into a corresponding voltage potential.

6. The driving method as claimed in claim 4, wherein the step of overlapping the negated voltage potential and feed-backed touch pulse signals further comprises:

adopting the negated voltage potential and the feed-backed touch pulse signals to conduct operations.

7. The driving method as claimed in claim 4, wherein the step of adopting overlapped signals to be the detected touch pulse signals further comprises:

recognizing the touch pulse signals and conducting a corresponding touch operation in accordance with a recognition result.

8. A driving device of touch display panels, comprising:

a voltage detection circuit connecting to a touch display panel, and the voltage detection circuit being configured for detecting at least one voltage potential of pixel electrodes within areas of the touch display panel, and the areas corresponding to different touch scanning partitions;

a compensation noise-deduction circuit connecting to the voltage detection circuit, and the compensation noise-deduction circuit being configured for negating the voltage potential detected by the voltage detection circuit, overlapping the negated voltage potential and feed-backed touch pulse signals, and adopting overlapped signals as the detected touch pulse signals, wherein the voltage detection circuit comprises:

a grayscale value calculation circuit connected to the touch display panel, and the grayscale value calculation circuit is configured for calculating an average grayscale value of the pixel electrodes within the areas corresponding to different touch scanning partitions, wherein the grayscale value calculation circuit calculates the grayscale values of the pixel electrodes within the areas corresponding to different touch scanning partitions, extracts characteristic grayscale values for calculating the average grayscale value from the grayscale values of the pixel electrodes; and calculates the average grayscale value of the pixel electrodes of the areas in accordance with the characteristic grayscale value;

wherein the characteristic grayscale value only comprises a maximum grayscale value, a minimum grayscale value, and a middle grayscale value; and wherein only the sum of the maximum grayscale value, the minimum grayscale value, and the middle grayscale value and the quotient of the three pixel electrodes corresponding to those characteristic grayscale values are adopted as the average grayscale value.

9. The driving device as claimed in claim 8, wherein the voltage detection circuit comprises:
a voltage feedback circuit connected to the grayscale value calculation circuit, and the voltage feedback circuit is configured for converting the average grayscale value into the corresponding voltage potential.

10. The driving device as claimed in claim 9, wherein the grayscale value calculation circuit is configured within the display driving circuit, and the voltage feedback circuit and the compensation noise-deduction circuit are configured within the touch driving circuit of the touch display.

11. The driving device as claimed in claim 8, wherein the touch display further comprises a touch pulse processing circuit connecting to the compensation noise-deduction circuit, and the touch pulse processing circuit is configured for recognizing the touch pulse signals and for conducting a corresponding touch operation in accordance with a recognition result.

* * * * *